United States Patent [19]
Hutchinson

[11] Patent Number: 5,767,419
[45] Date of Patent: Jun. 16, 1998

[54] HALL EFFECT FLUID FLOW SWITCH AND FLOW METER

[75] Inventor: Harold D. Hutchinson, Oxnard, Calif.

[73] Assignee: Harwill Corporation, Oxnard, Calif.

[21] Appl. No.: 736,050

[22] Filed: Oct. 22, 1996

[51] Int. Cl.$^6$ .................................................. H01H 35/40
[52] U.S. Cl. ........................... 73/861.74; 73/861.75
[58] Field of Search ......................... 73/861.71, 861.72, 73/861.73, 861.74, 861.75; 324/207.2

[56] References Cited

U.S. PATENT DOCUMENTS

| | | | |
|---|---|---|---|
| 3,971,253 | 7/1976 | Hini et al. | 73/861.74 |
| 5,002,090 | 3/1991 | Ichikawa et al. | 324/207.2 |
| 5,021,619 | 6/1991 | Hutchinson | 73/861.74 |
| 5,056,373 | 10/1991 | Gray | 73/861.75 |
| 5,277,195 | 1/1994 | Williams | 73/861.75 |

*Primary Examiner*—Ronald L. Biegel
*Attorney, Agent, or Firm*—David O'Reilly

[57] ABSTRACT

A fluid flow monitoring system comprised of a permanent magnet mounted on a bendable spring blade that provide an output from a Hall effect transducer as the permanent magnet is deflected toward the transducer. The permanent magnet can be mounted to directly approach the Hall effect transducer or can also be mounted to approach the transducer by a sideways bypass direction. Both the direct motion and sideways bypass direction allows the use of a variety of sizes and shapes of magnets that allow the magnetic field intensity to be modified in any way desired. Various magnet shapes such as cylinders, rectangles, pyramids, triangles or compound magnets from these shapes may be used. The output signal of the transducer is processed through a smoothing filter and circuits that produce a linear output or a stepped digital output. The system preferably uses a resistance/capacitance filter to provide a different time constant for an increasing flow or a decreasing flow. The output can be used as a flow switching circuit or as a flow meter, or as a flow quantity totalizer.

20 Claims, 10 Drawing Sheets

HALL EFFECT FLUID FLOW SWITCH AND FLOW METER

BACKGROUND OF THE INVENTION

1. Field of the Invention

This invention relates to fluid flow detection switches and flow meters and more particularly, relates to flow switches and flow meters that incorporate shaped flexible targets that are deflected by the fluid flow via a flow sensitive bending beam and, and are very sensitive; include electronic signal processing interfacing to provide flow switch flow meter and flow totalizer output information via a Hall Effect transducer.

2. Background Information

This invention is an improvement to existing flow switches and meters, such as that disclosed and claimed in U.S. Pat. No. 5,021,619 issued to the same inventor as the device disclosed and described herein, incorporated herein by reference.

The patent referred to above disclose a cantilevered flat flow sensing spring blade disposed to extend into the flow of a fluid through a pipe or conduit. The fluid flow drag forces bends the spring until the spring comes to rest against a hollow support tube located downstream of the spring. The support tube holds the spring steady to protect it from excessive stress and vibration induced by turbulent fluid flow.

In the prior art, devices known as "bending beam fluid flow switches and meters," the flow sensing spring activates a a reed switch inside the support tube from the effect of a magnet moving closer to the support tube. This provides an indication of a certain level of flow rate.

The switch triggering fluid flow rate is determined by adjusting the size, shape and stiffness of the spring supporting the magnet. Such magnet operated reed switches have an inherent hysteresis in their operation as the magnet approaches and recedes from the reed switch. At some point, the magnet is attracted to the reed switch by a magnetic force and quickly moves the last bit of distance to the support flow tube under the influence of the magnetic effect rather than because of the fluid force on the flow target spring thus, introducing potential errors into flow measurement.

The reed switch itself also has another mechanical hysteresis effect. This effect is that once closed, the switch tends to latch in the closed position; again by nonlinear magnetic attraction. Thus, when fluid flow declines, the reed switch still stays closed momentarily until the magnetic force between the magnet and the reed switch internal members no longer are able to resist their tendency to return to their normal relaxed position. Therefore, at this instant, the two magnetic members of the reed switch decouple and snap back to their normal relaxed positions and the switch opens. However, the fluid flow rate when the switch opens, will be below the fluid flow reed rate at which the switch closes. This is the magnetic/mechanical hysteresis interaction between the magnet and reed switch producing the related flow differential between the on and off condition, and is known as the "on-off hysteresis." In some situations, the hysteresis is a useful phenomenon because it prevents the switch from chattering on and off due to flow turbulence when the flow rate happens to be right at the switch triggering point.

In effect, the double magnetic latch, unlatch hysteresis of the magnet and reed switch internal blades create a fluid flow hysteresis dead band which reduces flow measuring sensitivity near the flow switch point. The magnetic hysteresis system and thus, the flow turbulence hysteresis system is completely determined by local magnetic fields of the magnetic/reed switch combination, which is a phenomenon attributed to each particular magnetic/reed switch combination and cannot be adjusted accept by changing one or both members.

It is therefore, one object of the present invention to employ Hall effect transducer technology to provide no mechanical magnetic coupling hysteresis since the Hall effect transducer body and internal components are non-magnetic and thus, totally magnetically transparent.

Yet another object of the present invention is to provide a Hall effect flow switch and analog flow meter that employs a very small repeatable and adjustable electronic hysteresis to ensure downstream electronic systems do not go into electronic oscillation.

It is another object of the present invention to provide a flow switch and meter that provides a flow induced variable magnetic field applied to a Hall effect transducer, which in turn provides a variable electronic output signal that precisely represents the fluid flow field through a pipe or equivalent conduit.

Yet another object of the present invention is to provide a flow switch and meter that employs Hall effect magnetically sensitive transducers in a digital mode and in a continuous analog output mode.

Yet another object of the present invention is to provide a fluid flow switch and meter that employs a Hall effect transducer with a variable magnetic field intensity obtained from a variety of magnet shapes, materials and strengths.

Yet another object of the present invention is to provide a fluid flow switch and meter for measuring the flow of fluids, gases and vapors impinging upon a flow sensitive bending arm, and employing a Hall effect transducer to produce a variable output voltage which is then translated by electronic processing circuitry into flow output information.

Yet another object of the present invention is to provide a flow switch and meter employing a Hall effect transducer, employing a variety of magnetic shapes, materials and configurations that include a direct in-line application of a magnet moving toward a Hall effect device or a sideways offset pass moving past a Hall effect device.

BRIEF DESCRIPTION OF THE INVENTION

The purpose of the present invention is to provide an improved fluid flow switch and fluid flow meter employing a Hall effect transducer and a bending beam that is very sensitive and in which fluid flow (liquid, gas or vapor) in a container (pipe, duct, etc.) impinge on a shaped flexible target which is then deflected, resulting in a modified magnetic field intensity which in turn, modifies the electronic output via the Hall effect transducer, which directly relates fluid flow rate to an electronic output voltage. The output voltage is then subject to electronic signal processing for output to various electronic instrument and control systems.

The present invention is constructed with a Hall effect transducer, producing zero magnetic coupling hysteresis, is mounted in a support tube adjacent to a spring bending blade on which a magnet is mounted. The Hall effect transducer will effectively replace the reed switch shown in U.S. Pat. No. 5,021,619 by the same inventor as the invention disclosed herein, and incorporated herein by reference.

The system employs a Hall effect magnetically sensitive transducer in a digital mode or in an analog continuous output mode. In the digital mode, the output voltage signal is zero until a preselected magnetic field intensity is presented to the transducer, which then shifts the output from zero to a fixed voltage in a rapid step function manner. This occurs when the magnet on the bending beam approaches the Hall effect transducer in the support tube sufficiently close to cause an output voltage equal to or greater than a preset value or reference voltage.

A continuous mode output is provided by a continuous analog output signal obtained relative to a variable magnetic field intensity applied to the Hall effect transducer. The variable magnetic intensity is obtained by using a variety of magnetic shapes, materials and strengths. The fluid flowing in a container or conduit impinges upon a flow sensitive bending beam having a variable shaped magnet which modifies and controls the magnetic field intensity in and around the Hall effect transducer mounted in the support tube. This produces a variable output voltage which completes the translation of flow input information in a variable analog electrical output that is processed by down stream electronic circuitry.

The magnets can be small sized disc magnets in relation to the size of the Hall effect transducer, or disc magnets that are relatively larger than the Hall effect transducer. Other magnet shapes can be rectangular, pyramidal, triangular plus variable shaped magnets as required for special situations. Variations could include a series of disc magnets that provide an increasing magnetic field or a series of rectangular magnets providing a variable magnetic field.

There are two methods of approaching the Hall effect transducer with a magnet. One method is a straight ahead approach in which a magnet mounted on a flow sensing bending spring blade, moves directly toward the sensitive surface of the Hall effect transducer. Another method is to use a sideways bypass approach in which the magnet is mounted on the flow sensing spring blade and passes by the Hall effect transducer at a predetermined distance. The shape and composition of the magnets determines the increase or decrease of the magnetic field as it approaches the Hall effect transducer.

The invention employs several components, and can be a minimum of a simple flow sensing blade having a magnet that approaches the Hall effect transducer to a small system consisting of varying magnet sizes, shapes and material plus a variety of downstream signal conditioning electronics that modify the signal received from the Hall effect transducer to provide a special output pattern such as a linear output. In one simple method, the flow with turbulence deflects the spring blade of a bending beam to produce a varying magnetic field. This in turn, produces a varying electrical output from the Hall effect transducer. For instance, the output voltage will be a stepped voltage when the system is configured as a flow switch.

Another more complex system, for using the device as a flow switch as well as a flow meter, employs variable magnetic fields that produce a variable non-uniform output voltage from the Hall effect transducer. In this embodiment, the flow deflects the flow sensing bending beam having an attached magnet which approaches the Hall effect transducer and produces an output signal to a signal smoothing filter, which is then processed by subsequent electronics to provide an analog flow metering system.

For a digital flow switch system, the electronic circuit includes a smoothing filter and a comparator comparing the voltage level with a reference voltage. The signal smoothing filter minimizes system turbulence effects and maximizes flow measurement sensitivity. For a flow meter system, the electronic circuit includes a smoothing filter and microprocessor type circuitry to produce a continuous analog output.

The preferable signal smoothing filter used is normally an RC (resistance/capacitance) signal smoothing filter. The RC smoothing filter receives a signal from an Hall effect transducer that produces a voltage proportional to the rate of fluid flow passing the combination of flow sensing bending beam and Hall effect transducer subsystem. The turbulent (noisy) voltage from the Hall effect transducer causes a current to flow through a resistor into a capacitor until it is charged to the same voltage as that produced by the transducer. The charged condition of the capacitor remains stable as long as the transducer voltage remains stable (i.e., the voltage of the capacitor will follow the transducer voltage exactly except at a new frequency response determined by the product of the resistor and capacitor, which is the RC time constant). The values of the resistor and capacitor can be selected to provide a relatively long time constant of approximately one second or more, which corresponds to a cut-off frequency of approximately 0.16 Hz. Lower frequencies pass through the RC filter and higher frequencies are blocked. The end result is a variable "low pass filter."

A feedback circuit comprised of a diode in series with a resistor, provides two different time constants for the RC circuit, one for increasing fluid flow and the second for decreasing fluid flow, thus providing additional operational flexibility.

The smooth and amplified output of a suitable processing circuit can be used to provide a continuous analog output relative to time to produce a fluid flow rate meter, which can be integrated over time to provide a fluid quantity totalizer. The smoothed output voltage can also be fed into a comparator circuit to produce step function switch actuation, voltages. Thus, the system of the invention can transform a fluid, gas or vapor flowing past a flow sensing flexible beam with magnet attached and a Hall effect transducer into a continuous analog voltage, which is then electronically processed to provide flow meter, flow totalizer and/or a fluid flow switch output information in any sequence or combination required.

The above and other novel features of the invention will be more fully understood from the following detailed description and the accompanying drawings, in which:

DETAILED DESCRIPTION OF THE INVENTION

Figure 1:
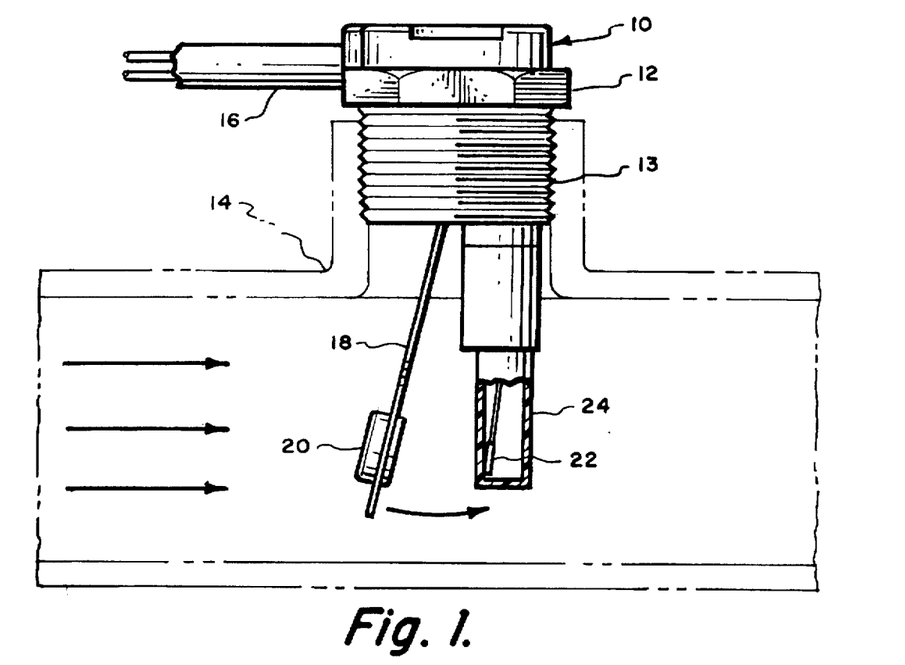
FIG. 1 is a partial sectional side elevation of a fluid flow sensing switch constructed according to the invention.
Figure 2A:
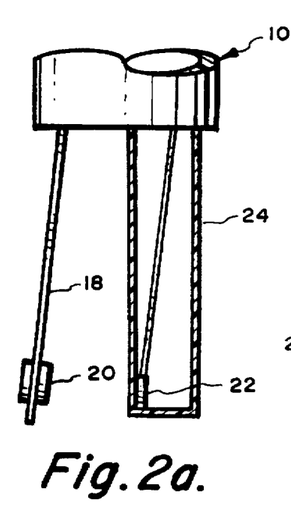
FIGS. 2(a) through 2(c) are diagrams illustrating the head-on motion of the embodiment of FIG. 1.
Figure 2B:
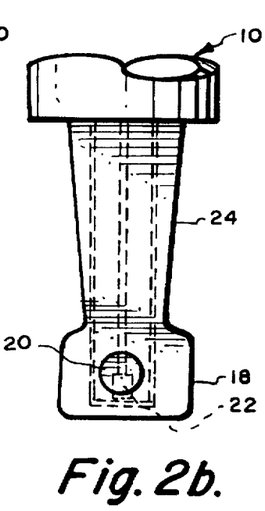
Figure 2C:
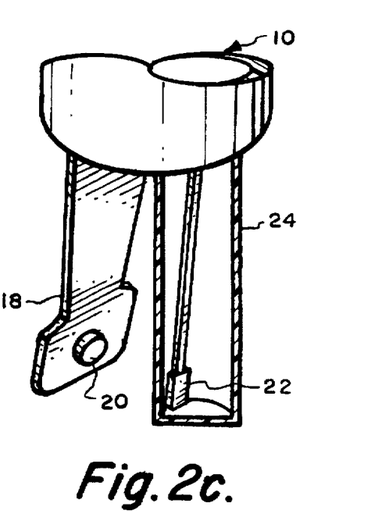

A Hall effect bending beam fluid flow monitor is illustrated in FIG. 1 and diagrammatically illustrated in FIGS. 2(a) through 2(c). This invention is an improvement to the flow responsive switch of U.S. Pat. No. 5,021,619 to the same inventor as the invention disclosed herein.

A fluid responsive switch is generally indicated at 10, having a housing 12 with threads for attaching the switch to a conduit or a container to monitor fluid flow in the direction indicated by the arrows. Flow responsive switch 10 is mounted on a tee-shaped fitting 14 for intercepting the flow through a conduit or into a container as indicated by the arrows. Cable 16 provides an electrical connection to flow responsive switch 10.

Flow responsive switch 10 has leaf spring 18, supporting magnet 20 which is responsive by deflecting according to the flow of fluid through tee 14, as indicated by the arrows. A transducer 22 is mounted in a support tube 24 extending into the path of the fluid that is responsive to the effect of the magnet 20, mounted on leaf spring 18 (i.e., bending beam) as it is deflected by the flow of fluid through tee 14. Transducer 22 is preferably a Hall effect transducer that responds to the magnetic effect of magnet 20 on bending beam 18.

Figure 3:
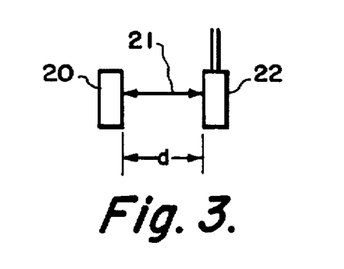
FIG. 3 is a diagram illustrating the operation of the head-on motion of the embodiment of FIG. 1.
Figure 4:
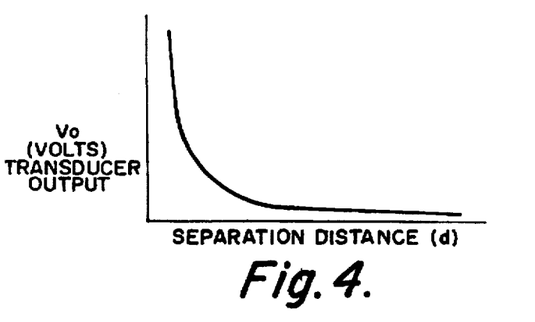
FIG. 4 is a graph of the transducer output relative to separation distance.
Figure 5:
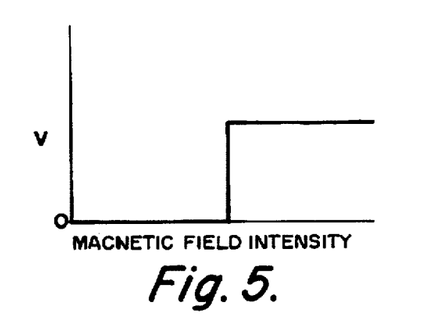
FIG. 5 is a graph of the output illustrating the system used as a digital step function response.
Figure 6:
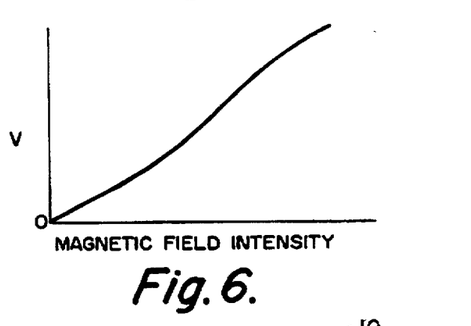
FIG. 6 is a graph illustrating the fluid responsive switch providing a continuous nonlinear analog function response.
Figure 7A:
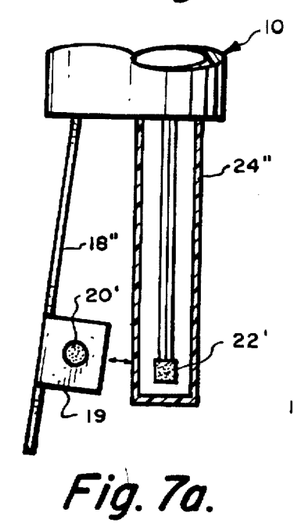
FIGS. 7(a) through 7(d) are diagrams illustrating an optional configuration of the flow responsive device in a sideways bypass mode.
Figure 7B:
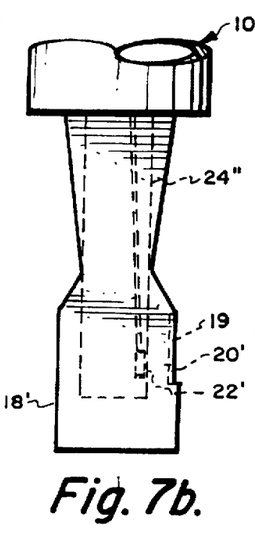
Figure 7C:
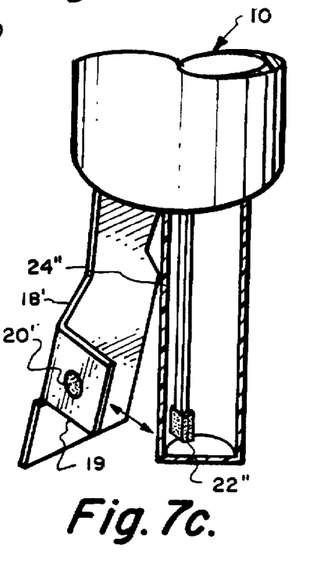
Figure 7D:
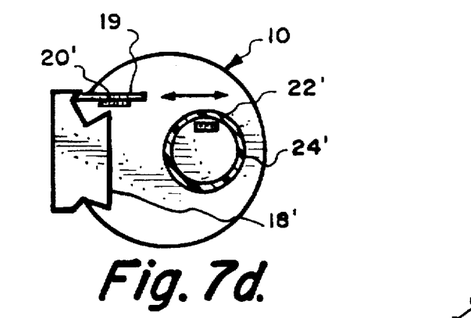
Figure 8A:
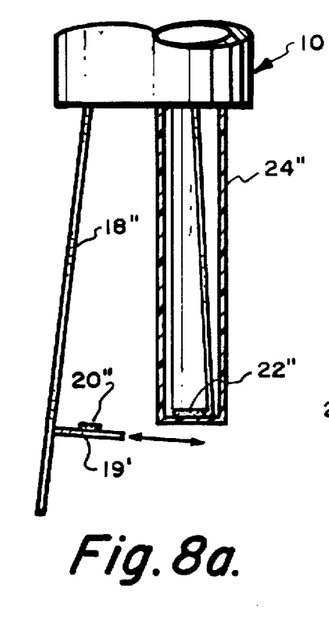
FIGS. 8(a) through 8(d) are diagrams illustrating another optional embodiment of the flow responsive device in a sideways bypass mode.
Figure 8B:
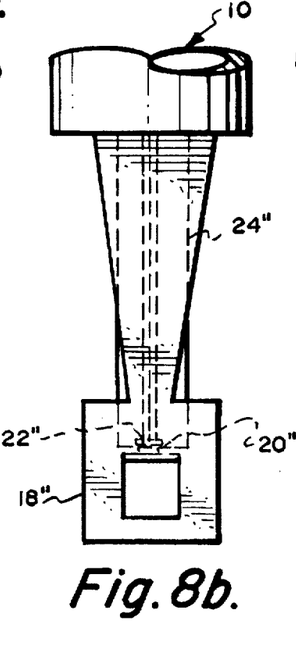
Figure 8C:
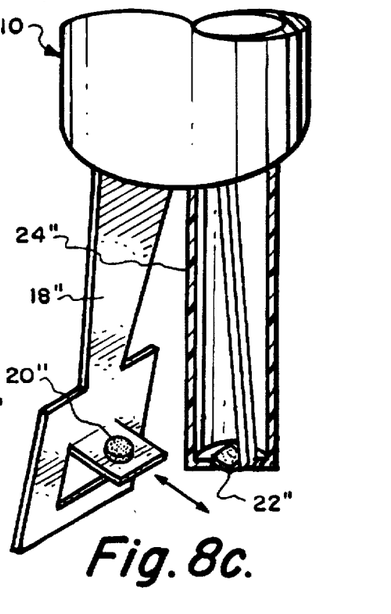
Figure 8D:
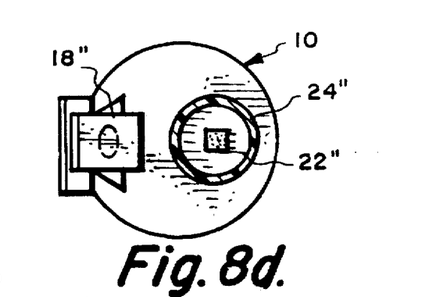

The operation of the head-on embodiment of FIG. 1 is illustrated by the diagram of FIG. 3 and graphs of FIGS. 4 through 6 with only the magnet 20 and Hall effect 22 shown for clarity. Magnet 20 is a typical disk or rod shaped magnet and its direction of motion toward or away from Hall effect transducer is indicated by the arrow 21. A variable output voltage from Hall effect transducer 22 is produced according to field intensity relative to charges in separation distance (d) as shown in the graph of FIG. 4.

Fluid moving through tee 14 bends leaf spring 18 to move magnet 20 toward Hall effect transducer in support tube 24. Leaf spring 18 may bend until magnet 20 rests against hollow support tube 24 located just downstream of the bending beam. Adjustment of the size, shape and stiffness of leaf spring 18 plus Hall effect transducer characteristics determines the triggering fluid flow rate. The Hall effect transducer 22 provides a significant improvement because it provides "zero" magnetic coupling hysteresis since the support body or housing 12 and support tube 24, as well as the internal components are non-magnetic and thus, are totally magnetically transparent. A very small and repeatable electronic hysteresis is introduced in down stream processing circuit to ensure downstream electronic systems do not go into undamped electronic oscillations, as will be described in greater detail hereinafter. Thus, flow in conduit connected to tee 14 introduces a variable magnetic field to Hall effect transducer 22, which in turn provides a variable electronic output signal that precisely represents the fluid flow field in the subcontainer. Thus, this system is more sensitive to fluid flows and can provide accurate readings of flow through conduit connected to tee 14.

Hall effect transducer 22 employs magnetically sensitive transducers in two different modes. These modes are illustrated in FIGS. 5 and 6. The digital mode provides a continuous output voltage signal, which remains at zero, until a preselected magnetic field intensity is presented to Hall effect transducer 22, which then shifts the output from zero to a fixed value in a rapid step function manner as illustrated in FIG. 5. Hall effect transducer 22 can also be used in a continuous analog output mode that varies as magnet 20 on bending beam 18 approaches the transducer and separation distance "d" becomes smaller. In a continuous output mode, a continuous non-linear analog function response or signal, as illustrated in FIG. 6, is obtained relative to variable magnetic field intensity applied to transducer 22. Thus, the system disclosed can be used as both a flow switch, and also as a flow meter to determine the flow rate and total volume of the flow.

The system can employ magnet 20 on bending beam 18 in a straight head-on approach of the magnet directly to the sensitive surface of Hall effect transducer 22, as illustrated in FIGS. 1 and 2. However, the system can also employ a sideways bypass approach illustrated in the diagrams of FIGS. 7(a) through 7(d) and 8(a) through 8(d). Referring to FIGS. 7(a) through 7(d), a Hall effect transducer 22' is placed in support tube 24' facing toward the side rather than directly toward the magnet as shown in FIG. 1. Leaf spring 18' is provided with a side extension 19 having a magnet 20'. Thus, the flow of fluid in tee 14 (FIG. 1) will force leaf spring 18' toward support tube 24' with extension 19 passing beside Hall effect transducer 22'.

Figure 9:
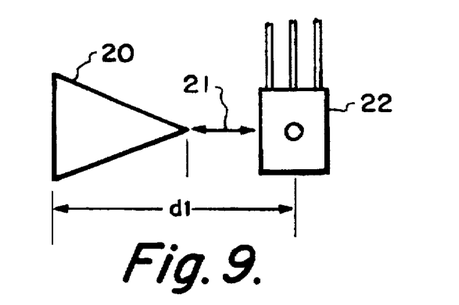
FIGS. 9 and 10 are diagrams illustrating the operation of the sideways bypass embodiment of the invention.
Figure 10:
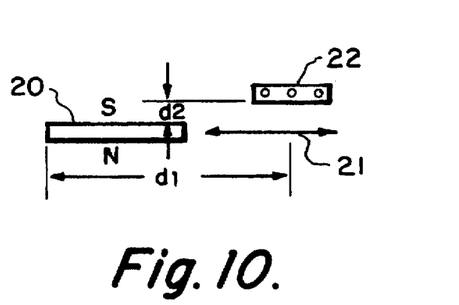
Figure 11:
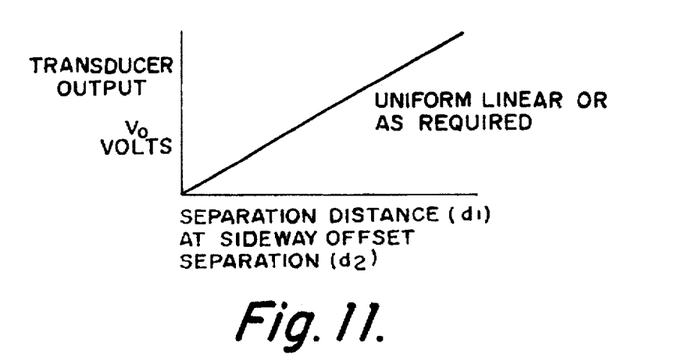
FIG. 11 is a graph of the transducer output relative to the sideways offset and separation distance of the embodiments of FIGS. 7 and 8.

A further option would be to have leaf spring 18" as shown in FIGS. 8(a) through 8(d) with extension 19' extending at right angle to the bottom of leaf spring 18' so that it will pass beneath the support tube 24" and Hall effect transducer 22". The embodiments of FIGS. 7 and 8 have separation distances "$d_1$" and "$d_2$" between magnets 20 and Hall effect transducer 22 as shown in the diagram of FIGS. 9 and 10. Separation distance "$d_1$" will vary as magnet 20 moves toward or away from Hall effect transducer 22 while sideways separation distance "$d_2$" remains constant. Magnet 20 can have special shapes as will be described in greater detail hereinafter. The effect is to produce a voltage that has an output curve that may be a linear straight line of FIG. 11, or could be a nonlinear curve similar to that shown in FIGS. 4 and 6. Nonlinear output curves are made linear with downstream microprocessor electronics, as will be described in greater detail hereinafter.

Figure 12A:
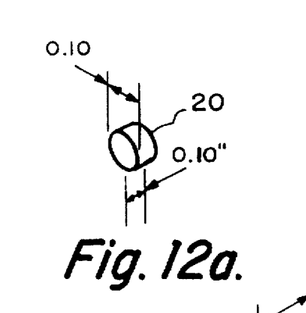
FIGS. 12(a) through 12(c) are diagrams that illustrate various permanent magnet shapes and typical dimensions relative to a typical Hall effect transducer.
Figure 12B:
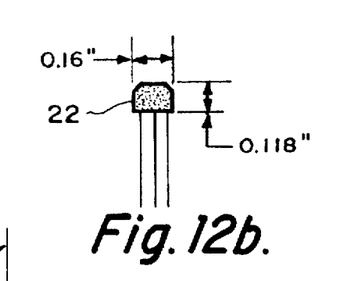
Figure 12C:
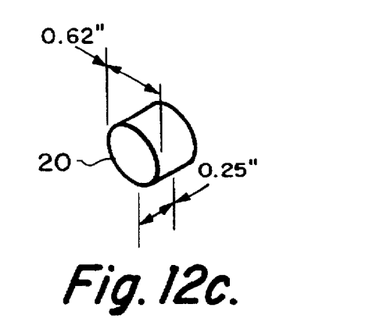
Figure 13A:
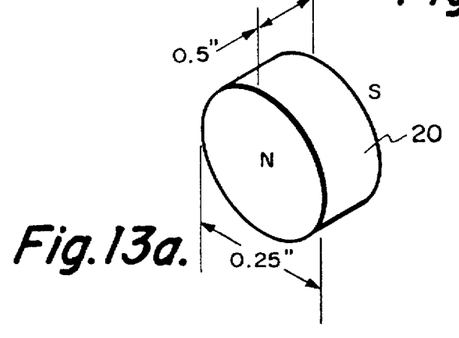
FIGS. 13(a) through 13(i) are illustrations of the various magnetic shapes that can be used in the fluid responsive switch according to the invention.
Figure 13B:
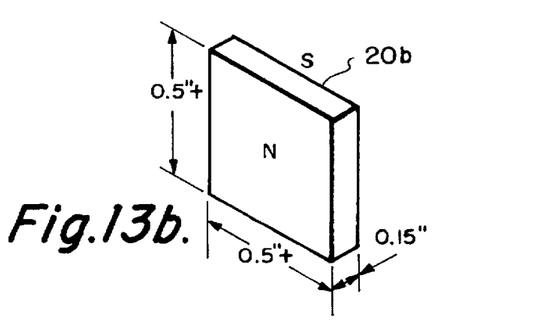
Figure 13C:
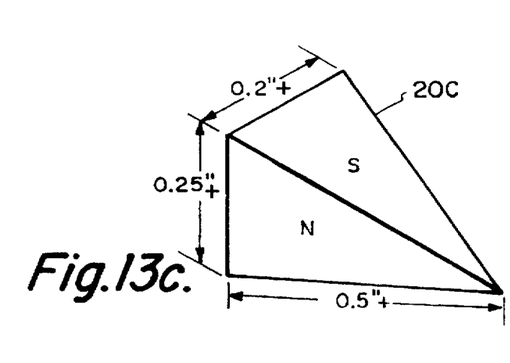
Figure 13D:
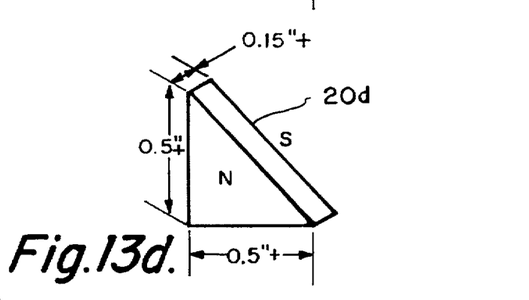
Figure 13E:
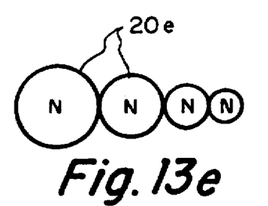
Figure 13F:
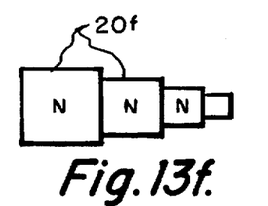
Figure 13G:
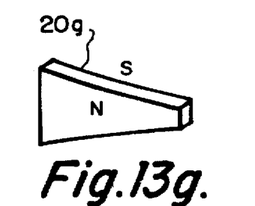
Figure 13H:
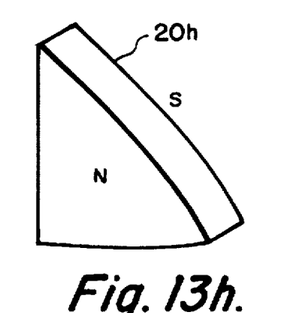
Figure 13I:
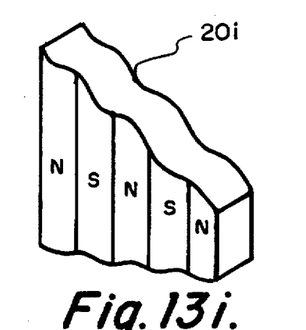
Figure 14A:
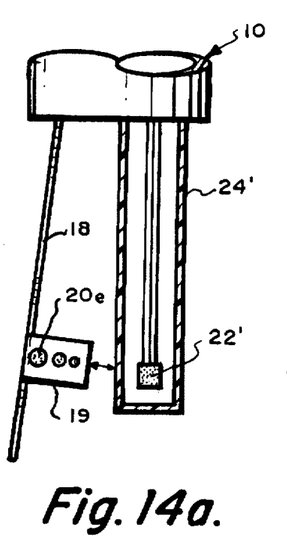
FIGS. 14(a) through 14(d) are diagrams of a flow responsive device in a sideways bypass mode with an optional magnet configuration.
Figure 14B:
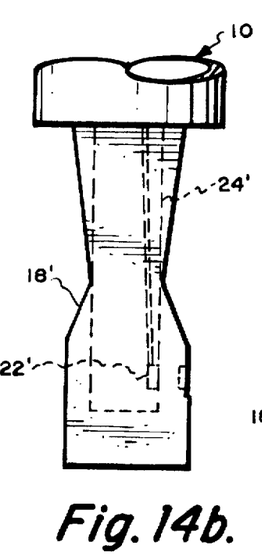
Figure 14C:
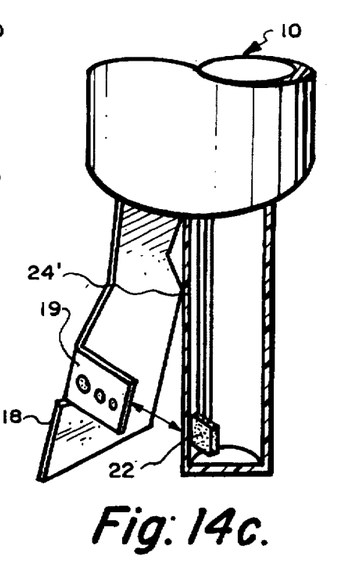
Figure 14D:
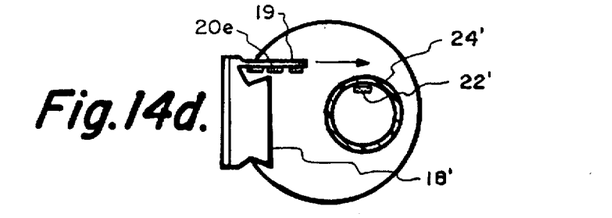
Figures 15A, 15B, 15C, 16A, 16B, 16C:
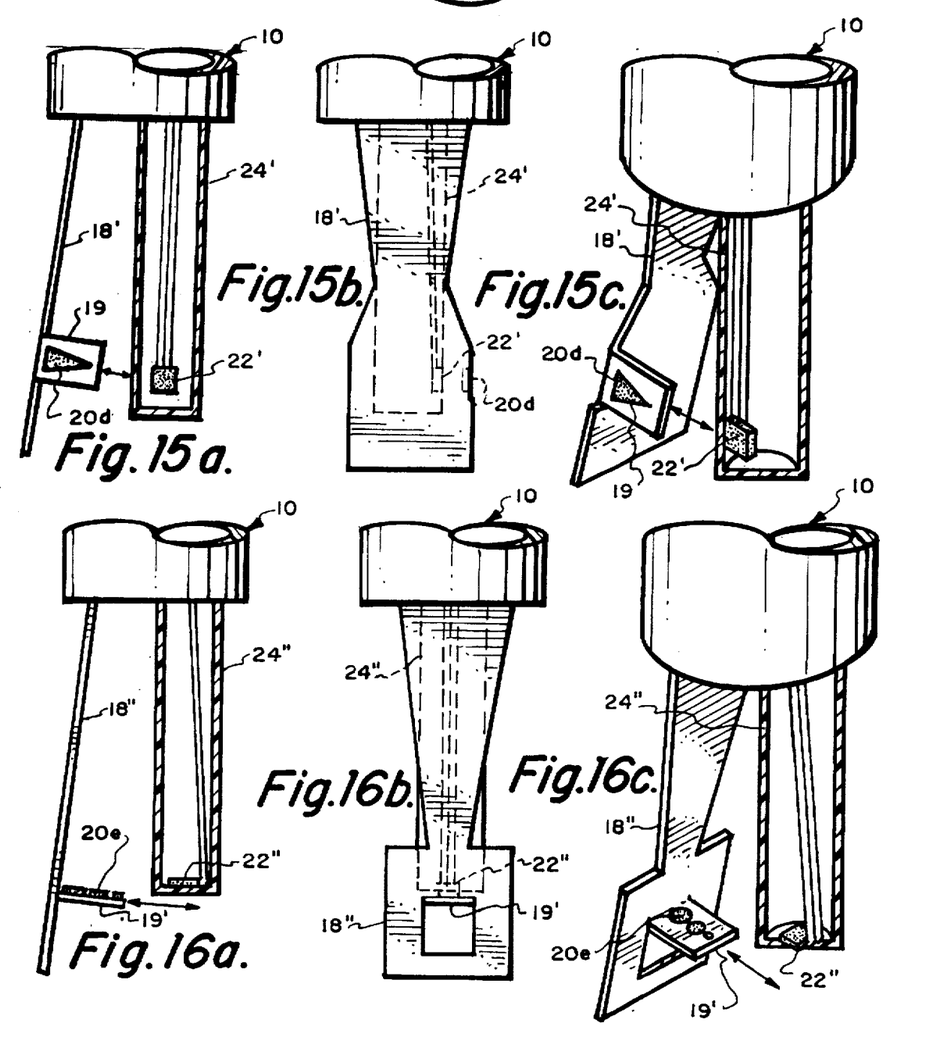
FIGS. 15(a) through 15(c) are diagrams of a flow responsive device in a sideways bypass mode having another optional magnet configuration.
FIGS. 16(a) through 16(d) are diagrams of a flow responsive in a sideways bypass mode having still another optional magnet configuration.
Figures 16D, 17D:
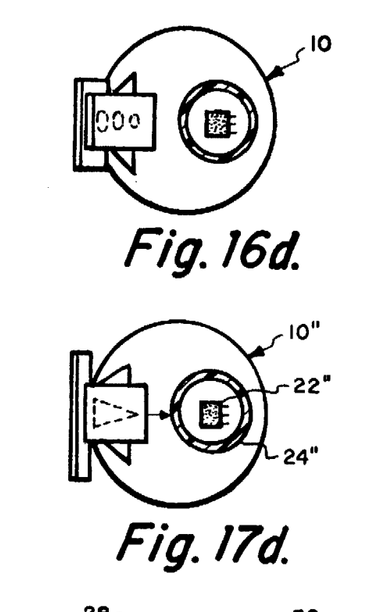
FIGS. 17(a) through 17(d) are diagrams of a flow responsive in a sideways bypass mode having yet another optional magnet configuration.
Figure 17A:
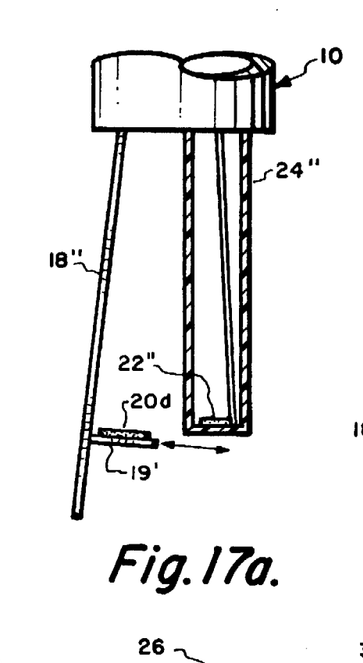
Figures 17B, 17C:
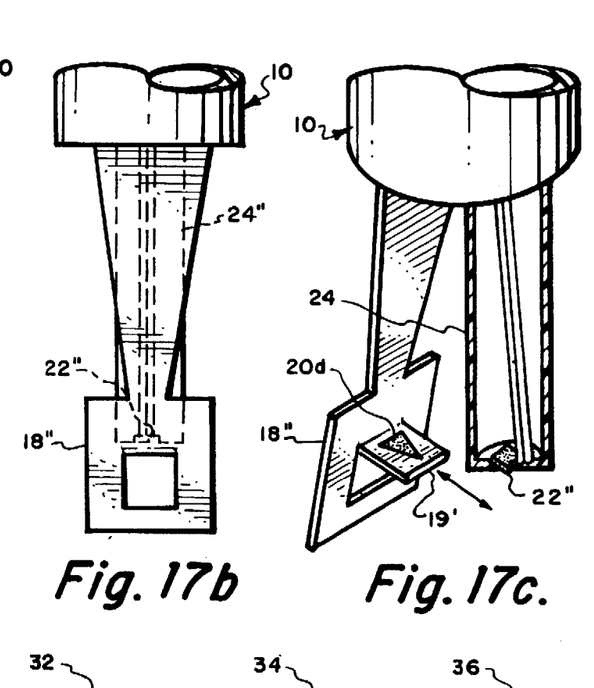

The advantage of the sideways bypass devices of FIGS. 7 and 8 is that they permit three principle methods to be employed to modify the magnetic field intensity in the volume of space in and around Hall effect transducers 22' and 22". One of these methods is to employ a variety of magnet shapes as illustrated in FIGS. 12(a) through 12(c) and 13(a) through 13(i). FIGS. 12(a) through 12(c) illustrate varying the size of disk magnet 20 relative to Hall effect transducer 22. In FIG. 12(a) a magnet is shown that could be smaller or the same size as Hall effect transducer 22 while in FIG. 12(c) a much larger disk shaped transducer is shown. FIG. 13(a) shows a conventional cylindrical disk-shaped permanent magnet 20 that is illustrated in FIG. 1. Permanent magnet 20b could also be rectangular, as shown in FIG. 13(b); a pyramid shaped magnet 20c, as illustrated in FIG. 13(c) or a triangular magnet 20d as illustrated in FIG. 13(d). Other optional shapes are a compound permanent magnet 20e, comprised of a plurality of cylindrical disk-shaped magnets as shown in FIG. 13(c), or a compound permanent magnet 20f, comprised of a plurality of rectangular magnets as shown in FIG. 13(f). FIGS. 13(g) and 13(i) illustrate the various shapes and combinations of magnets that can be used in the system.

The various magnetic shapes, materials and strengths illustrated in FIGS. 13(a) through 13(i) provide a variety of magnetic field intensities. The varying magnetic field intensities can be used to activate both digital and linear Hall effect transducers. The device disclosed herein is principally concerned with fluids, gases and vapors impinging upon flow sensitive leaf spring 18, which modifies and controls a magnetic field intensity level in and around Hall effect transducer 22, which then produces a variable output voltage which completes the translation of flow input information into a variable electrical output.

Figure 18:
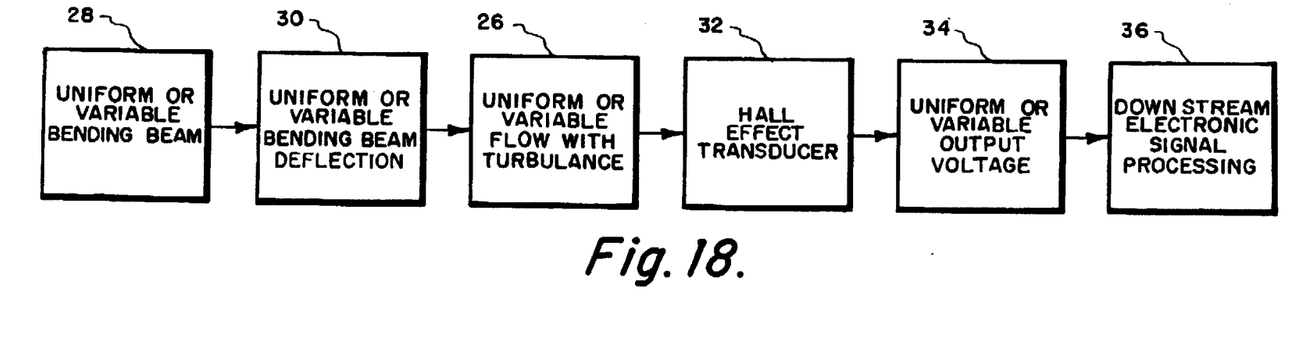
FIG. 18 is a schematic block diagram illustrating the signal processing of the system.

The operation of the system is generally indicated in the block diagram of FIG. 18. A fluid flows through a conduit or tee 14 (FIG. 1) and produces a flow with turbulence 26, which provides a uniform or variable deflection 30 of bending beam 28. Bending beam leaf spring 28, with permanent magnet 20 produces a magnetic field strength which directly effects a Hall effect transducer 32, producing a uniform or variable output voltage 34 that is then processed by an output signal processing circuit 36. The circuit can be designed to produce a digital step output as illustrated in FIG. 5 for an on/off function, or an analog magnetic output as shown in FIG. 6.

The permanent magnets as previously described, can provide a variety of magnetic field intensities according to the shape and composition of the magnet, but also by the size of the magnet as shown in FIGS. 12(a) through 12(c). A small size disc magnet 20 (FIG. 12(a)), in relation to the size of Hall effect transducer 22 will produce a lower voltage output. A slightly larger size magnet 20 (FIG. 12(c)), relative to typical Hall effect transducer 22, will produce a different output function. Also, whether or not magnet 20 approaches Hall effect transducer 22 directly, or by the sideways bypass of FIGS. 7 and 8, will effect the shape of output function.

Figure 19A:
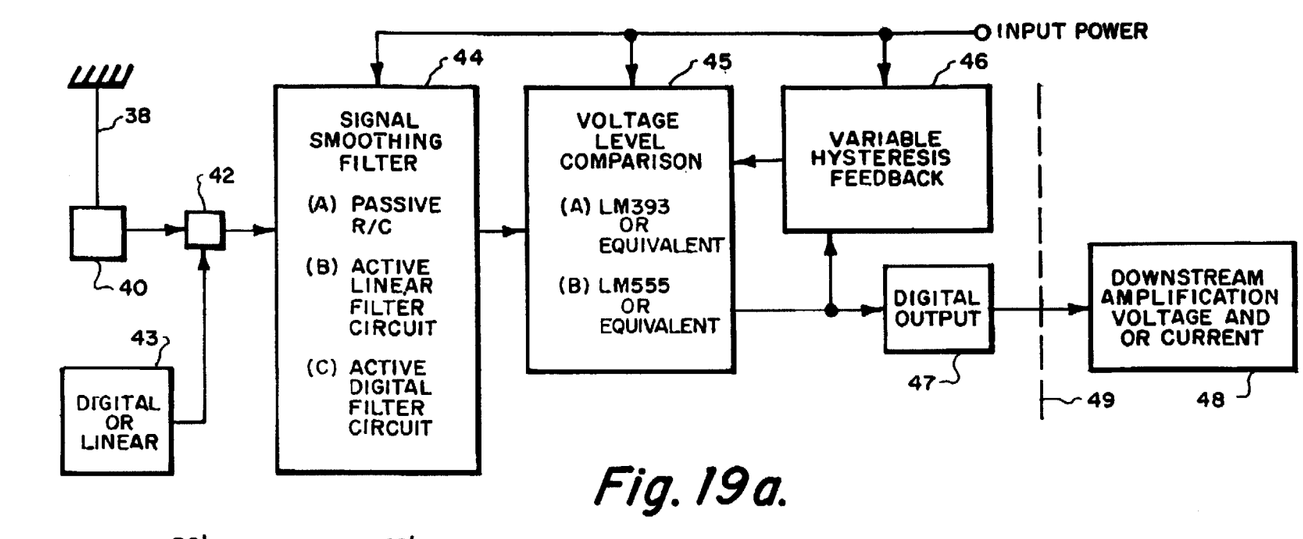
FIG. 19(a) is a schematic block diagram illustrating the system for providing a digital switched output.
Figure 19B:
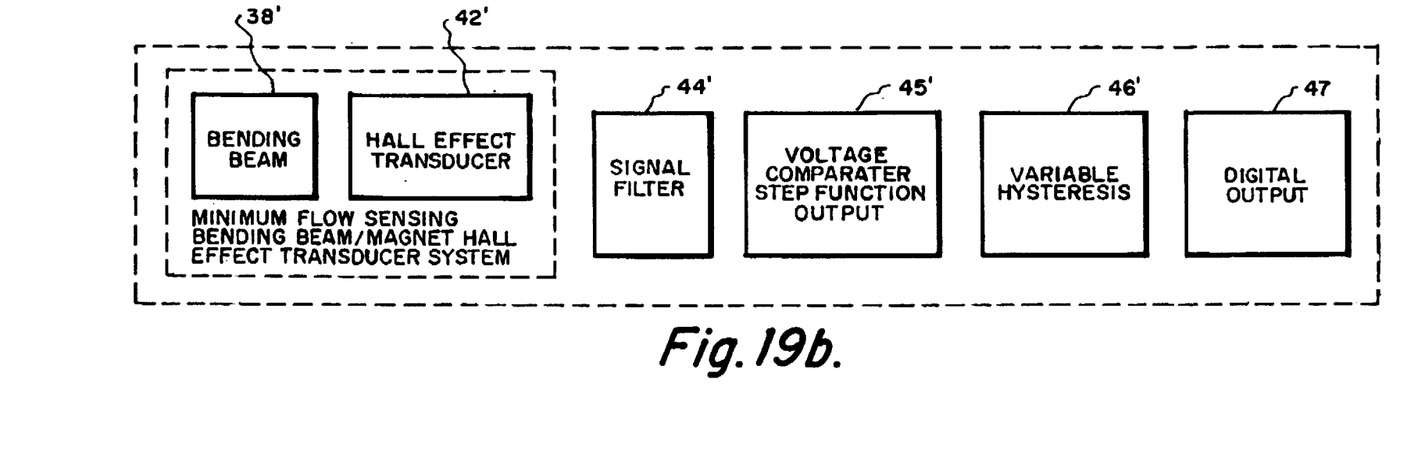
FIG. 19(b) is an informational block diagram describing the schematic of FIG. 19(a).

A Hall effect system, used as a digital flow switch system, is illustrated in the schematic block diagram of FIGS. 19(a) and 19(b). FIG. 19(b) is an informational block diagram describing schematic block diagram of FIG. 19(a) with like reference numbers indicating like functions. Bending beam 38, having magnet 40, is deflected toward a Hall effect transducer 42 with a linear or digital output 43 as illustrated in FIG. 1. The system illustrated in the schematic block diagram of FIG. 19(a) can be the direct approach permanent magnet of FIG. 1 or the sideways bypass permanent magnets 20' or 20" of FIGS. 7 and 8. The voltage output of Hall effect transducer 42 is then fed to a signal smoothing filter 44. Signal smoothing filter 44 is an important element in the system. Because the system shown in FIGS. 1, 7 and 8, substantially minimize or eliminate the system hysteresis of the system illustrated in prior U.S. Pat. No. 5,021,619, the flow measurement sensitivity is maximized, which is a desirable operational parameter. However, this also increases the sensitivity of the system to flow turbulent noise. The low signal-to-noise ratio condition, presented by the sensitivity to flow turbulence is corrected by including a signal smoothing filter 44 as a part of the signal processing electronics. The output of smoothing filter 44 is then fed to a voltage level comparator 45, which also receives a variable hysteresis signal 46. Variable hysteresis 46 is a very small and repeatable electronic hysteresis introduced to ensure downstream electronic systems do not go into undamped electronic oscillations.

Voltage level comparator 45 compares the output from signal smoothing filter 44 with a reference voltage and produces digital output 47 when the signal reaches or exceeds the reference level. The output may be amplified by downstream amplifier 48 and then fed to output signal processor (not shown) for additional processing and delivery to a suitable control system input function. Interface 49 indicates that downstream operations such as amplification 48 and other processing, are operations that may be provided by the customer. Voltage level comparator 45 can be an LM393 or equivalent. An LM393 is specifically designed as a comparator, however, voltage level comparator 45 could also be an operational amplifier without a feedback resistor due to its very high open-loop gain. Further, more sophisticated electronic filtering can be employed; such as digital notch filters, band pass filters, etc. to suppress acoustic, mechanical and electrical noise introduced into the system from outside sources.

Figure 20A:
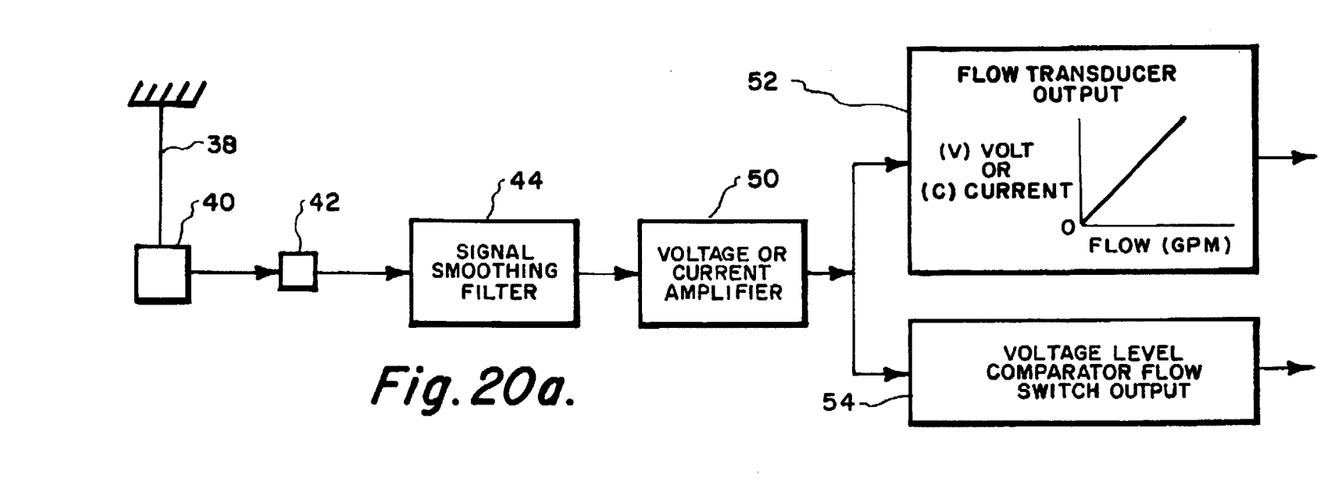
FIG. 20(a) is a schematic block diagram of a system for providing both a fluid flow analog output and a digital switched output.
Figure 20B:
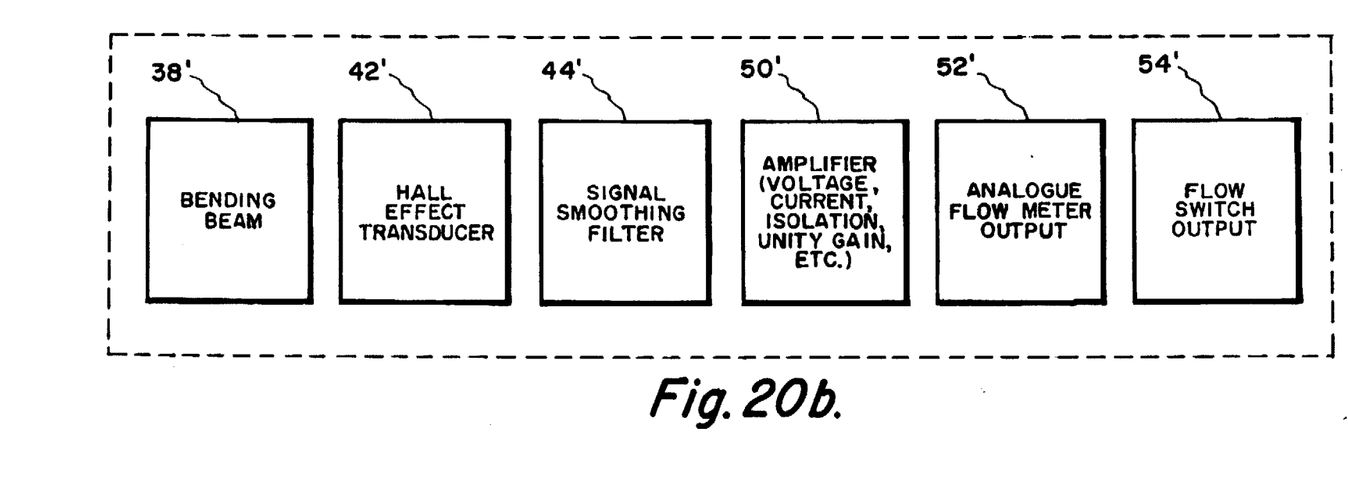
FIG. 20(b) is an informational block diagram describing the schematic of FIG. 20(a).

The system can also be used as a combined flow meter, flow totalizer and flow switch with signal processing illustrated in the schematic block diagram of FIGS. 20(a) and 20(b). FIG. 20(b) is an informational diagram of FIG. 20(a) of system 10' as before. In this system, fluid flow deflects beam 38 having magnet 40 toward Hall effect transducer 42 as before. The output of Hall effect transducer 42 is then smoothed by signal smoothing filter 44 for output to amplifier 50 that provides outputs to two circuits. One is a flow analog output circuit 52, while the second is a voltage level comparator 54. Flow linear analog output circuitry 48 transforms the input signal into a continuous analog voltage which is then electronically linearized to provide a typical flow meter output signal. This output can then be integrated over time to provide a flow quantity totalizer output signal. The second output from amplifier 50 is fed to a voltage level comparator 54 which changes states when the output goes above or below a reference voltage thereby, providing a typical flow switch step function output signal.

Figure 21:
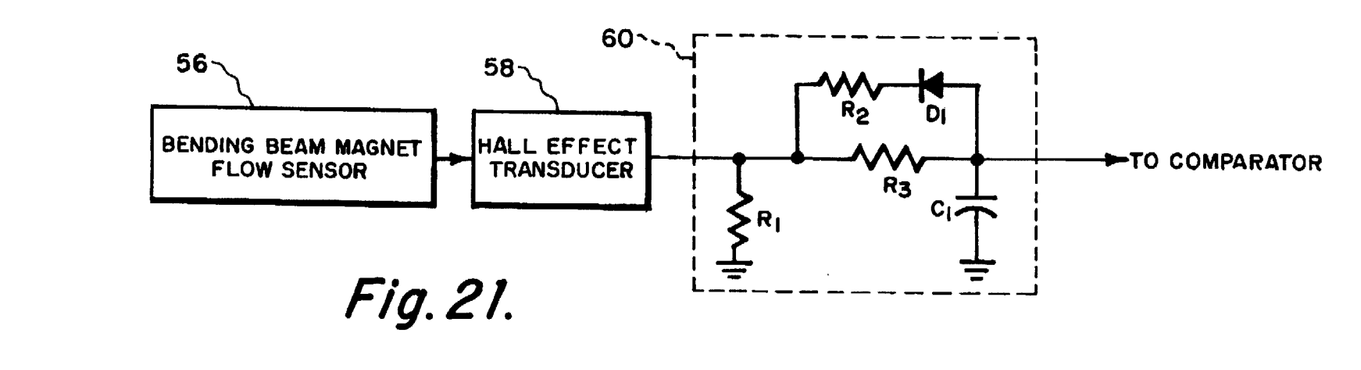
FIG. 21 is a schematic block diagram of a smoothing filter suitable for use in the systems of FIGS. 6 and 7.
Figure 22A:
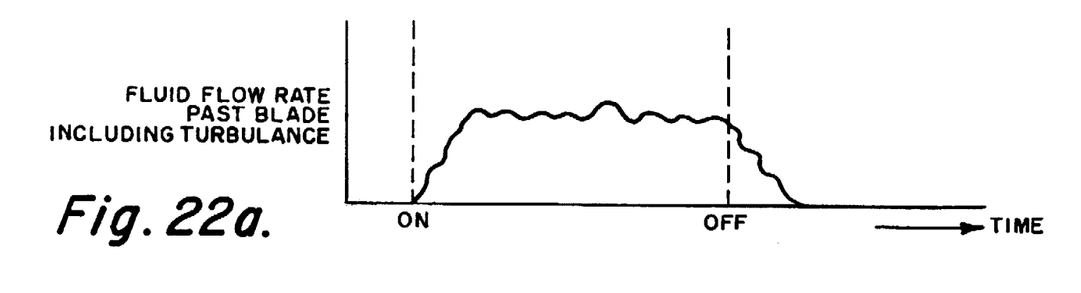
FIGS. 22(a) and 22(b) are graphs of the fluid flow rate before and after smoothing by the filter of schematic diagram of FIG. 21.
Figure 22B:
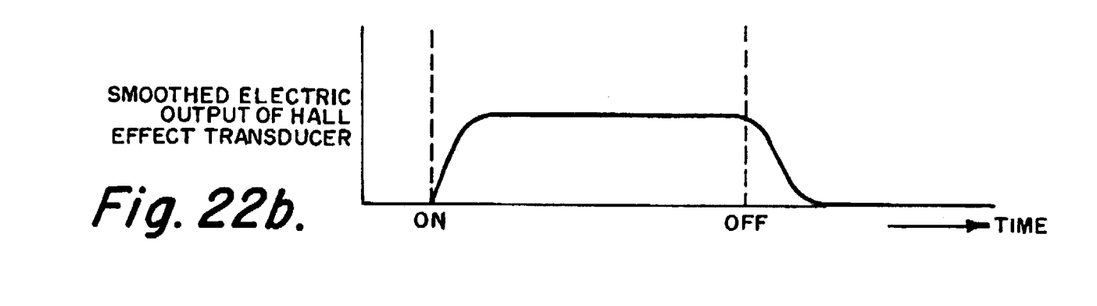

One form of a signal smoothing filter is illustrated in FIGS. 21, 22(a) and 22(b). FIG. 22(a) shows the output turbulence while FIG. 22(b) shows the output smoothed by the filter of FIG. 21. Bending beam 18 is deflected by the flow of fluid in a tee 14 (FIG. 1) to move permanent magnet 20 toward Hall effect transducer 22 providing a sensor 56 output Hall effect transducer 58 to RC filter 60. The output of Hall effect transducer 58 produces a voltage proportional to the rate of fluid flow passing past flow sensing leaf spring 18 and permanent magnet 20. This voltage causes a current to flow from Hall effect transducer 58 through resistor R3, into capacitor C1 until it is charged to the same voltage as that produced by Hall effect transducer 58. The charge condition of capacitor C1 will remain stable as long as the output voltage of Hall effect transducer 58 remains stable (i.e., the voltage of capacitor C1 will follow transducer 58 voltage exactly except at a new frequency response determined by the product of resistor R3 and capacitor C1 (known as the RC time constant)). For instance, resistor R3 and capacitor C1 can be selected to provide a relatively long time constant of approximately one second which corresponds to a cutoff frequency of approximately 0.16 Hz (FIG. 21). Lower frequencies will pass through the RC filter and higher frequencies will be blocked.

When the flow of fluid decreases, the voltage output of Hall effect transducer decreases and capacitor C1 discharges to ground through parallel resistors R2 and R3 in series with resistor R1. Diode $D_1$ thus, provides two different time constants, one for increasing fluid flow and a second for decreasing fluid flow thus, providing additional operation and flexibility. Feedback circuit of resistor R2 and diode D1 can be eliminated if desired, which would produce a different time constant dependent on the values of resistors R1, R3 and C1.

Thus, there has been disclosed a fluid responsive monitoring system utilizing a Hall effect transducer that transform a fluid, gas or vapor flowing past a bending beam having a permanent magnet into a continuous analog voltage which is then electronically processed to provide a flow meter, a flow totalizer and/or a fluid flow switch output information in any sequence or combination as required. The system employs a bending beam magnet that is mounted to directly approach a Hall effect transducer or by a sideways bypass system to produce a voltage output from the transducer.

This invention is not to be limited by the embodiment shown in the drawings and described in the description which is given by way of example and not of limitation, but only in accordance with the scope of the appended claims.

What is claimed:

1. A fluid responsive monitoring system for monitoring the flow of fluid in a conduit comprising;

a support body attached to said conduit;

a support tube mounted on said support body, said support tube extending into said conduit to intercept a fluid flowing in said conduit;

a Hall effect transducer mounted in said support tube;

a flexible arm mounted on said support body extending into the path of a fluid flowing in said conduit, said flexible arm having an extension at right angles to the plane of said flexible arm;

magnetic means mounted on said flexible arm spaced from said Hall effect transducer;

said magnetic means being mounted on said right angle extension so that said fluid moves said magnet means in a sideways bypass approach to said Hall effect transducer;

whereby when a fluid in said conduit deflects said flexible arm with said attached magnet toward said Hall effect transducer a voltage output representing the flow rate of fluid in said conduit is produced.

2. The system according to claim 1 in which said magnetic means mounted on said flexible arm comprises a permanent magnet.

3. The system according to claim 2 in which said flexible arm is mounted proximate said Hall effect transducer; said permanent magnet being mounted so that said fluid moves said permanent magnet toward to said Hall effect transducer.

4. The system according to claim 3 in which said permanent magnet has a shape that increases the magnet's intensity as it passes toward, or by said Hall effect transducer.

5. The system according to claim 3 in which said permanent magnet is a cylindrical disc-shaped magnet.

6. The system according to claim 3 in which said magnet is a rectangular magnet.

7. The system according to claim 2 in which said permanent magnet is a cylindrical magnet.

8. The system according to claim 2 in which said permanent magnet is a rectangular magnet.

9. The system according to claim 2 in which said permanent magnet has a pyramidal shape.

10. The system according to claim 9 in which said permanent magnet is a triangular cross-sectional shape.

11. The system according to claim 2 in which said permanent magnet has a triangular cross-sectional shape.

12. The system according to claim 2 in which said permanent magnet is a series of increasingly larger permanent magnets.

13. The system according to claim 12 in which said series of increasingly larger permanent magnets is a series of increasingly larger cylindrical disc-shaped magnets.

14. The system according to claim 13 in which said series of increasingly larger permanent magnets is an increasingly larger rectangular magnets.

15. The system according to claim 1 including electronic processing means for processing the output of said Hall effect transducer comprising;

a signal smoothing filter; and output signal conditioning means.

16. The system according to claim 15 in which said signal smoothing filter is a RC smoothing filter; said RC smoothing filter having a first time constant for an increasing fluid flow and a second time constant for a decreasing fluid flow.

17. The system according to claim 15 in which said signal conditioning means comprises a comparator for producing a step function digital output mode.

18. The system according to claim 15 in which said signal conditioning means comprises a linear analog output circuit means.

19. The system according to claim 15 in which said output signal conditioning means comprises a non-linear analog circuit means.

20. The system according to claim 15 in which said signal conditioning means comprised integrating output circuit means to obtain total flow quantity over a selected time interval.

* * * * *